United States Patent [19]

Lazaroff

[11] Patent Number: 4,805,954

[45] Date of Patent: Feb. 21, 1989

[54] DRIVER WHEELCHAIR LOCKDOWN

[76] Inventor: Lewis S. Lazaroff, 4901 Ward Rd., Wheat Ridge, Colo. 80033

[21] Appl. No.: 107,154

[22] Filed: Oct. 13, 1987

[51] Int. Cl.[4] .................... B60N 1/02

[52] U.S. Cl. .................... 296/65.1; 296/68.1; 410/7; 410/51; 280/304.1; 297/DIG. 4

[58] Field of Search .................... 296/65 R, 65 A; 280/289 WC, 242 WC; 410/51, 7; 297/15, DIG. 4

[56] References Cited

U.S. PATENT DOCUMENTS

| | | | |
|---|---|---|---|
| 3,955,847 | 5/1976 | Schiowitz | 296/65 R |
| 4,389,056 | 6/1983 | Tenniswood | 280/289 WC |
| 4,457,663 | 7/1984 | Heins et al. | 297/DIG. 4 X |
| 4,623,289 | 11/1986 | Apostolos | 296/65 R X |
| 4,690,364 | 9/1987 | Constantin | 296/65 R X |
| 4,730,964 | 3/1988 | Joyner | 280/289 WC X |

FOREIGN PATENT DOCUMENTS

| | | | |
|---|---|---|---|
| 2827377 | 1/1980 | Fed. Rep. of Germany | 410/7 |

*Primary Examiner*—Robert B. Reeves
*Assistant Examiner*—Brian Sells
*Attorney, Agent, or Firm*—James E. Pittenger

[57] ABSTRACT

A clamping apparatus for releasably securing a wheelchair to a base, such as the floor of a motor vehicle, is provided. The clamping apparatus includes a frame which is capable of being rigidly secured to the base and a movable clamp which is pivotally attached to the frame and capable of being moved between a wheelchair clamping position and a wheelchair release position. When in the clamping position, the clamp is capable of secure engagement with the wheelchair to prevent relative movement between the wheelchair and the base. When in the release position, the clamp disengages from the wheelchair, thereby permitting relative movement between the wheelchair and the base. Power driven actuating means for moving the clamp between the clamping and release positions is provided.

6 Claims, 3 Drawing Sheets

Fig_5
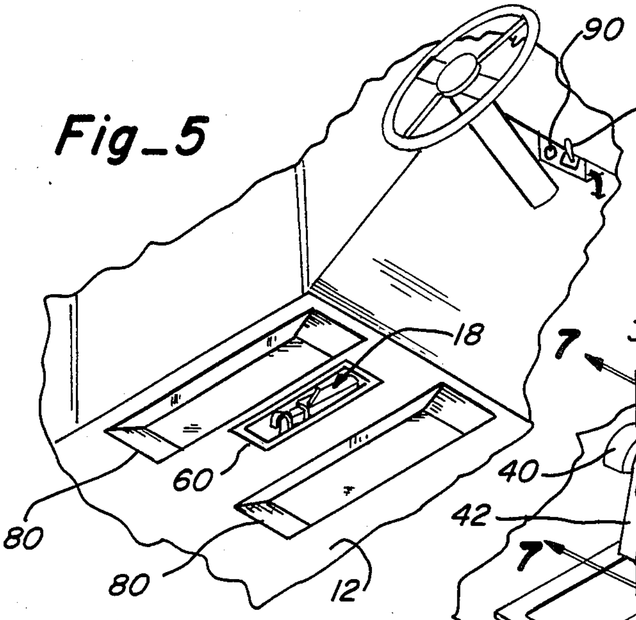
Fig_6
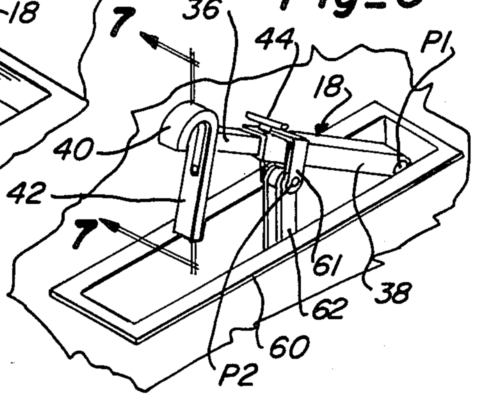
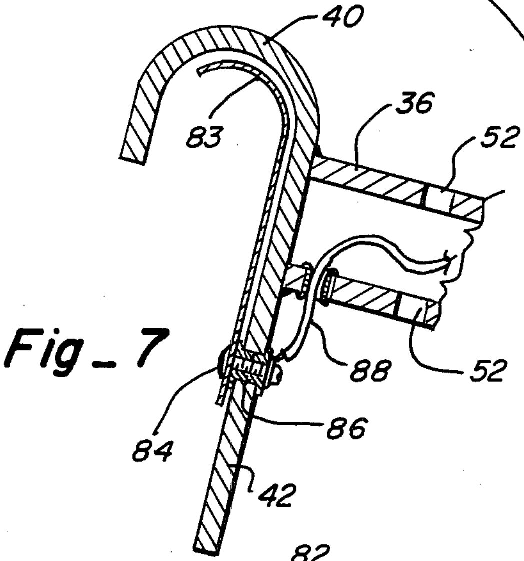
Fig_7
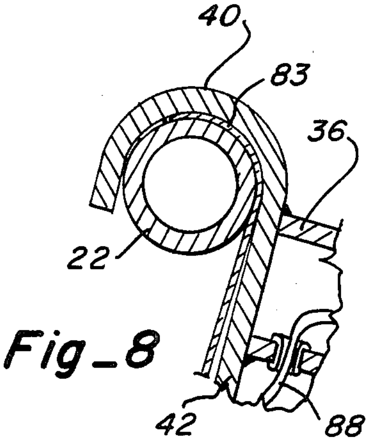
Fig_8
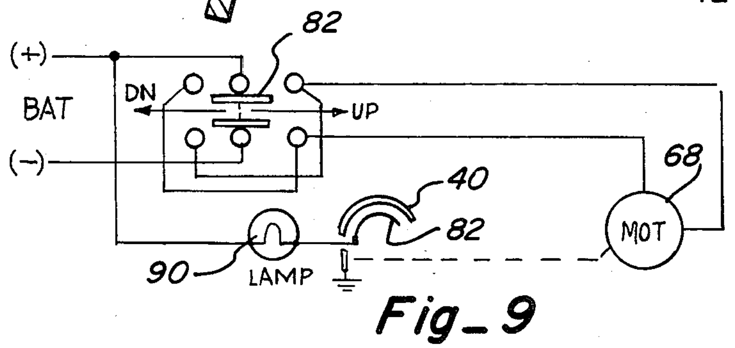
Fig_9

DRIVER WHEELCHAIR LOCKDOWN

BACKGROUND OF THE INVENTION

The invention relates to a power driven clamping apparatus in general and more particularly to a power driven clamping apparatus for releasably securing a wheelchair to the floor of a motor vehicle.

Society has become increasingly receptive to accommodating handicapped and/or disabled individuals. For example, most recently built buildings are provided with wheelchair ramps, handicapped bathroom facilities and handicapped parking spaces located near the building. While much progress has been made toward helping the handicapped, there still remains a need for mobility which can provide a measure of freedom for the handicapped. This mobility can be provided by a motorized vehicle, such as a van, which can be easily entered, operated and exited by a handicapped individual without assistance.

A primary object of the present invention is to provide a clamping apparatus which is capable of releasably securing a wheelchair to the floor of a motor vehicle which can be controlled by the wheelchair occupant without assistance.

Another object of the present invention is to provide a wheelchair clamping apparatus which can be controlled by a wheelchair occupant while he or she is seated in the wheelchair.

Yet another object of the present invention is to provide a wheelchair clamping apparatus which can be easily released or disconnected from the floor of the motor vehicle even if a power failure in the motor vehicle occurs or if the vehicle is involved in an accident.

INFORMATION DISCLOSURE STATEMENT

In compliance with applicant's duty to disclose to the Patent Office information which is material to this application, applicant states that he is unaware of any issued patents or prior devices which are material to the examination of this application.

SUMMARY OF THE INVENTION

The present invention is directed to a clamping apparatus for releasably securing a wheelchair to a base, such as the floor of a motor vehicle so that a wheelchair occupant can operate the vehicle without assistance.

The clamping apparatus includes a frame or housing which is capable of being rigidly secured to the base or motor vehicle floor. A movable clamp is provided which is pivotally attached to the frame and capable of being moved between a wheelchair clamping position and a wheelchair release position. The clamp is capable of clamping engagement with the wheelchair to rigidly anchor the wheelchair to the floor of the motor vehicle when the clamp is in the clamping position. When the clamp is in the release position, it will be disengaged from the wheelchair thereby enabling the occupant to move the chair within the vehicle. The clamping apparatus also includes a power operated actuating device for moving the clamp between the clamping and release positions.

Preferred embodiments of the apparatus include a clamping adapter which is sized and configured to rigidly attach to the wheelchair. The adapter preferably has telescoping components which enable the overall length of the adapter to be adjusted so that the adapter can accommodate differently sized wheelchairs. Other preferred embodiments also include a manual release arrangement for releasing the wheelchair from the motor vehicle's floor when an electrical system failure occurs.

BRIEF DESCRIPTION OF THE DRAWINGS

Other features of this invention will appear in the following description and appended claims, reference being made to the accompanying drawings forming a part of the specification wherein like reference characters designate corresponding parts in the views.

FIG. 5 is a partial perspective view of a van's interior showing the movable clamp and frame of the present invention installed in the van's floor;

FIG. 6 is a perspective view of the pivotable clamp and frame of the present invention showing the clamp in its raised or wheelchair release position;

FIG. 7 is a a cross-sectional view taken along the lines 7—7 of FIG. 6;

FIG. 8 is a partial cross-sectional view showing the claw of the clamp engaging the center bar of the adapter;

FIG. 9 is an electrical circuit diagram for the clamping apparatus;

FIG. 1 is a cross-sectional view taken along lines 11—11 of FIG. 10;

DETAILED DESCRIPTION OF THE INVENTION

Figure 1:
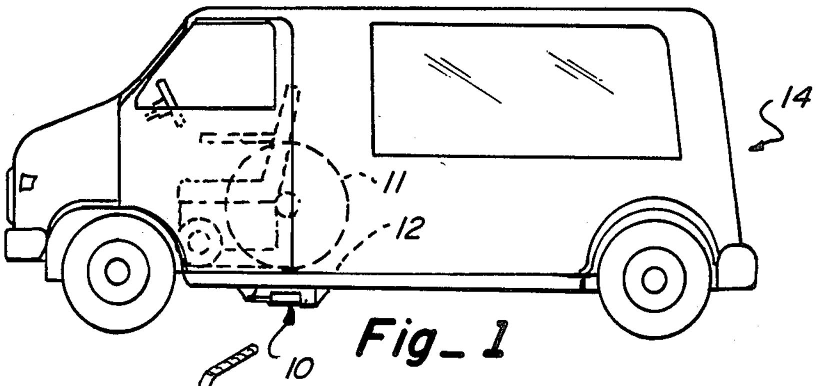
FIG. 1 is a side view of a vehicle or van showing in phantom the clamping apparatus of the present invention securing a wheelchair to the van's floor.

FIGS. 1 through 13 illustrate a preferred embodiment of a clamping apparatus 10 of the present invention for releasably securing a wheelchair 11 to the floor 12 of a vehicle such as a van 14. The van's driver seat has been removed so that a handicapped individual occupying a wheelchair 11 will be able to move or wheel the chair into the driver's position and secure it with the clamping apparatus 10 of the present invention. Once secured, the wheelchair occupant will be able to operate the van without additional assistance.

The clamping apparatus 10 includes three main components; a clamping adapter 16, a pivotable clamp 18 and an actuating device 20 for moving clamp 18.

Figure 2:
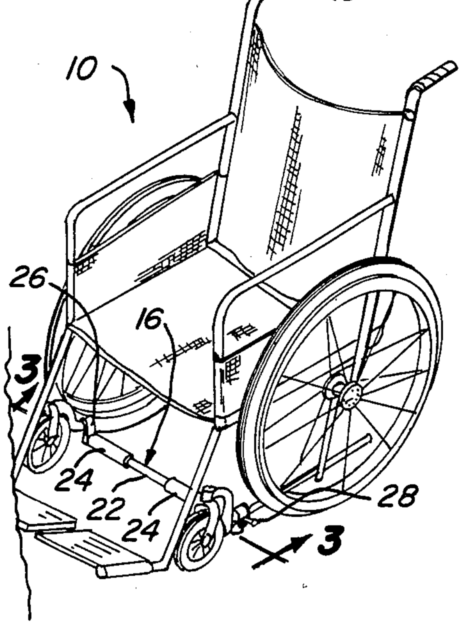
FIG. 2 is a perspective view of a wheelchair having a clamping adapter of the present invention rigidly attached thereto.
Figure 3:
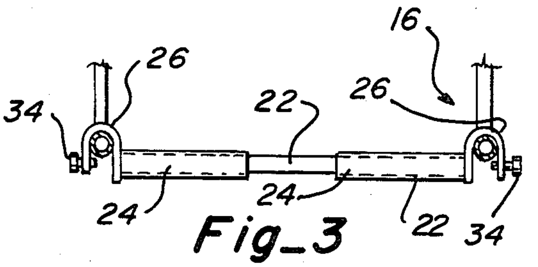
FIG. 3 is a view of the clamping adapter taken along lines 3—3 of FIG. 2.
Figure 4:
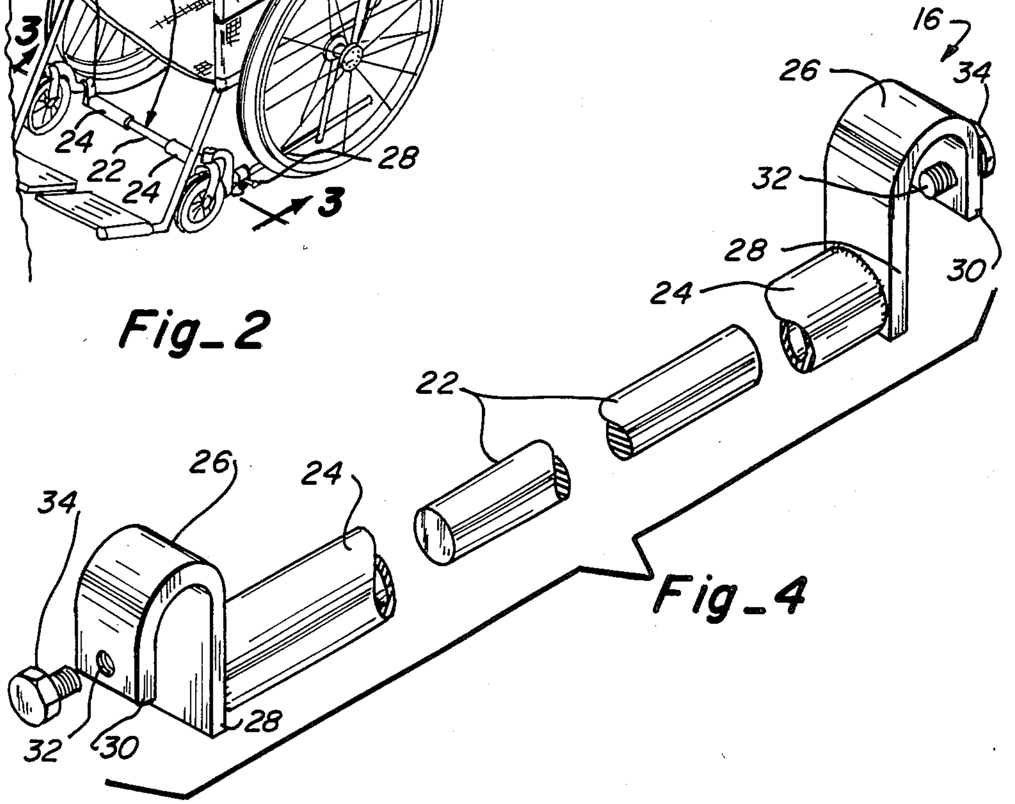
FIG. 4 is an exploded perspective view of the clamping adapter of the present invention.
Figure 10:
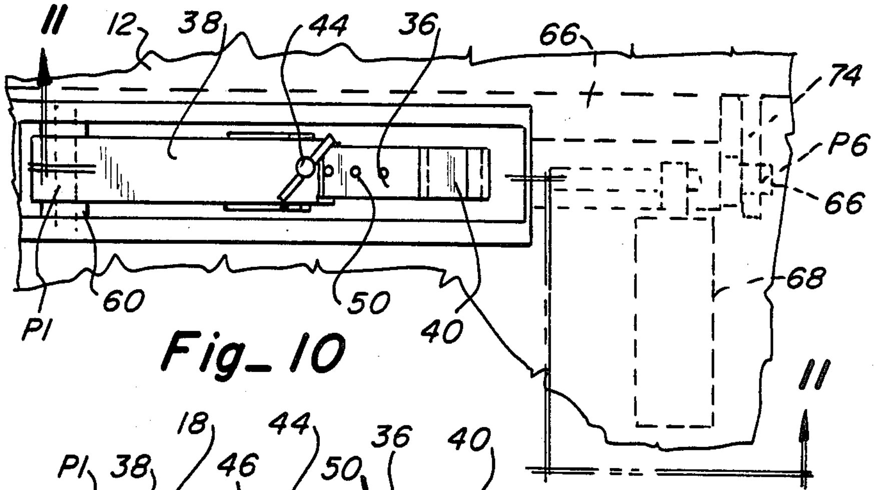
FIG. 10 is a top view of the clamp and frame of the present invention.

FIGS. 3 and 4 illustrate adapter 16 in isolation while FIG. 2 illustrates adapter 16 after it has been rigidly attached or secured to the wheelchair's frame in accordance with the present invention. Adapter 16 includes a solid cylindrical center bar 22 and a pair of hollow cylindrical pipe-like telescoping portions 24. Each telescoping portion 24 telescopingly engages an associated end of center bar 22. The telescoping engagement permits one to adjust the adapter's overall length so that the adapter can accommodate wheelchairs having different frame styles and widths.

Each telescoping end portion 24 of the adapter 16 has a C-shaped clamp portion 26 having a long end 28 and a short end 30. Each long end 28 is welded to its associated end of telescoping portion 24 as illustrated. In addition, each clamp portion's short end is provided with a threaded bore 32 which receives a threaded bolt 34. When the adapter is placed on the wheelchair with C-clamps 26 situated about the wheelchair's frame as illustrated in FIG. 3, tightening of bolts 34 will rigidly secure the clamping adapter 16 to the wheelchair.

Movable or pivotable clamp 18 illustrated in FIGS. 5 through 13 generally includes a square tubular inner telescoping member 36, a square tubular outer telescoping member 38 and a C-shaped claw 40. Claw 40 is provided with a long end 42 which is welded to the outer end of member 36. The respective ends of members 36 and 38 are in telescoping engagement with each other and are releasably secured together by a manual release device 44.

Release device 44 includes a threaded winghead bolt 46 and a securing device such as nut 48. Nut 48 is welded to the lower exterior side of outer telescoping member 38 so that the threads are in communication and axially aligned with a pair of axially aligned holes 50 provided in the opposing sides of member 38. Wing bolt 44 releasably secures telescoping members 36 and 38 by being inserted through one of several pairs of axially aligned holes 52 provided in inner telescoping member 36. Member 36 is provided with a plurality of longitudinally spaced holes 52 to enable a person to adjust the combined length of telescoping members 36 and 38.

To release the clamp and separate telescoping members 36 and 38, one merely removes bolt 46. Accordingly, inner telescoping member 36 may then be manually pulled out of outer member 38 which, thereby, disengages or releases the wheelchair from the van's floor.

It is to be understood that while the wing bolt release device has been described and illustrated, it is possible to use any of a number of devices for releasably holding the clamp and wheelchair in a locked position and yet release the chair manually when required. As an example, a pin and clip could be inserted through aligned holes 50 and 52 to hold the telescoping members 36, 38 in place.

While the manual method of disengaging the wheelchair from the van's floor is available, it is not the usual method of releasing the chair from the vehicle. The usual method is motorized and will be discussed in more detail below. It will be necessary, however, to use the quick release or manual method when the van's battery dies or some other electrical system failure or emergency occurs.

Figure 11:
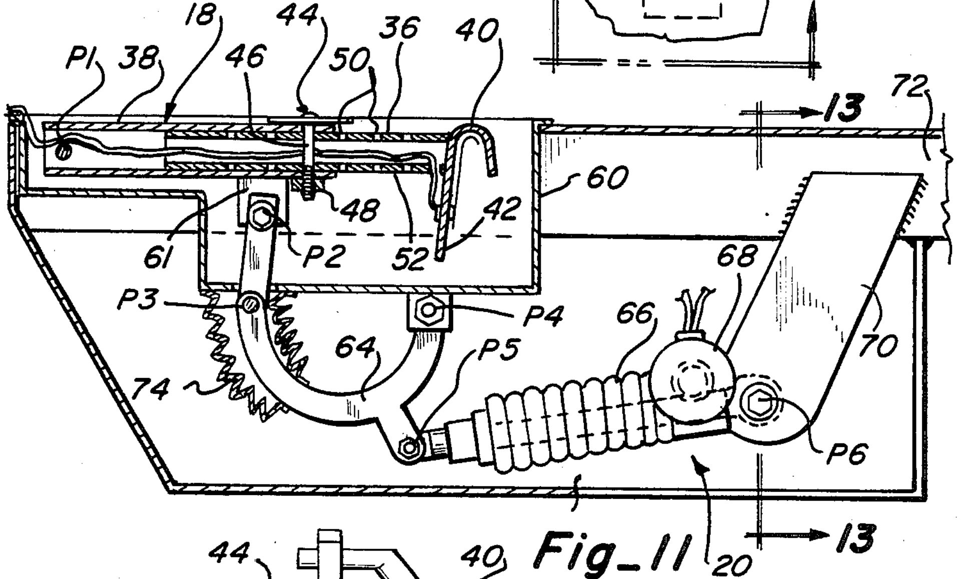
Figure 12:
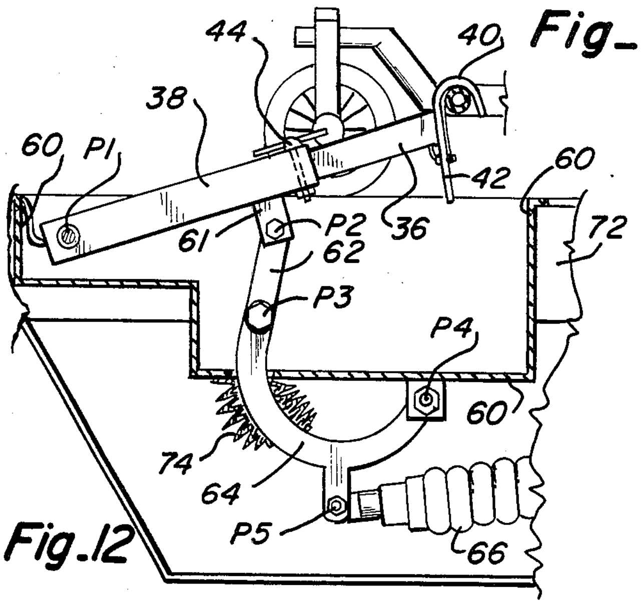
FIG. 12 is a partial cross-sectional view showing the clamp in the clamping position.

Returning to figures, FIGS. 11 and 12 in particular, it can be seen that outer telescoping member 38 of clamp 18 is attached at two points, P1 and P2. P1 is the pivot between the end of member 38 and the frame 60 of the clamping apparatus. Frame 60 is essentially a recessed box which forms the housing for clamp 18. As can be visualized from the drawings, the frame 60 has been inserted into and welded to a portion of the van's floor which has been cut out to accommodate the frame. If desired, the frame 60 may, as an alternative, be bolted to the van's floor.

P2 is a pivot between a tab 61 which is welded to the under side of telescoping member 38 and a first end of link 62 of actuating means 20.

Figure 13:
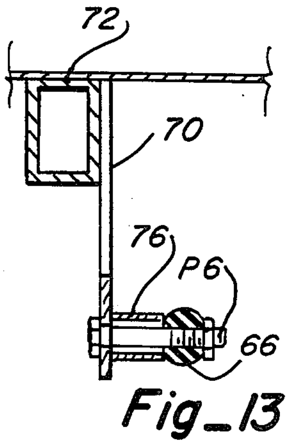
FIG. 13 is a cross-sectional view taken along lines 13—13 of FIG. 11.

Actuating means 20 includes link 62, a bell crank 64, a linear actuator 66, a reversible motor 68 and a mounting bracket 70. Bracket 70 is welded at one end to the van's frame 72 and is pivotally attached at its opposite end to the base end of lineal actuator 66 by pivot P6. Reversible motor 68 is mounted on the linear actuator 66 which perferably is a conventional screw-type actuator. When motor 68 is activated in one direction the actuator's length increases and when activated in the other direction, it contracts. The actuator's outer end is pivotally attached to an intermediate portion of the bell crank 64 by pivot P5. Pivot P4 is the pivotal attachment between the bell crank's outer end and the bottom portion of frame 60. Pivot P3 is the pivotal attachment between the bell crank's outer end and the second end of link 62. Pivot P3 and the components housed inside frame 60 are protected from the elements by a flexible cover 74 which extends between an intermediate portion of bell crank 64 and an opening (not numbered) in frame 60. All pivots P1 through P6 are conventional pivoting bolt assemblies including a bolt, nut and washer (not numbered). As illustrated in FIG. 13, P6 also includes a collar-like spacer 76 which is mounted on the shaft of the support bolt extending between bracket 70 and the respective end of linear actuator 66.

A van having the clamping apparatus of the present invention would also preferably have a conventional wheelchair lift apparatus which would enable an individual occupying a wheelchair to get into and out of the van without assistance. Such a lift is typically mounted on the van either off the van's rear or side door. To enter or leave the van, a wheelchair occupant typically would; (1) move the wheelchair onto the lift; (2) activate a switch which would either raise the wheelchair to the van's floor level or lower it to ground level; and (3) move the wheelchair off the lift.

After moving the wheelchair off the lift onto the van's floor, the wheelchair occupant in accordance with the present invention maneuvers the wheelchair into the driver's position so that the wheels of the wheelchair enter a pair of tracks 80 provided in the van's floor (see FIG. 5) and against the inside surface of claw 40 on raised clamp 18. Tracks 80 are helpful in guiding the wheelchair into its proper position for the clamping or locking operation.

If for some reason the clamp is in the lowered position, the wheelchair occupant activates a two-way (up-down) switch 82 mounted on the van's dashboard which raises clamp 18 from its down position illustrated in FIG. 11 to its up or release position illustrated in FIG. 6. The occupant then positions the wheelchair so that the clamp adapter's center bar 22 is resting against the outwardly facing surface of the claw 42. The occupant then moves switch 82 to its down position which lowers claw 40 of movable clamp 18 about center bar 22. This results in clamping engagement of the claw about the center adapter bar which secures the wheelchair to the van's floor.

FIG. 8 illustrates clamping engagement of center bar 22 by claw 40 in isolation. It can be seen in FIG. 8, that a metallic strip 83, preferably made of copper or other electrically conductive material, is sandwiched between center bar 22 and claw 40 which is electrically grounded.

When center bar 22 and claw 40 are not in clamping engagement as illustrated in FIG. 7, the strip 83 is spaced a slight distance away from grounded claw 40. The lower end of strip 83 is, however, attached to the claw's long end 42 by a bolt assembly 84 which is electrically insulated from the grounded claw by an insulating bushing 86. Bolt assembly 84 is, in turn, connected to a wire lead 88 which is coupled to a lamp 90 mounted on the van's dashboard which, in turn, is coupled to the van's battery as illustrated in the circuit diagram shown in FIG. 9.

When claw 40 is lowered into clamping engagement about adapter center bar 22, strip 83 becomes sandwiched between grounded claw 40 and center bar 22 as previously described. This action puts strip 83 in electrical contact with grounded claw 40 thereby completing that portion of the circuit illustrated in FIG. 9. Since clamping engagement of claw 40 and center bar 22 occurs when lamp 90 lights, lighted lamp 90 will indicate to the wheelchair occupant that the wheelchair is secured to the van's floor. The occupant may then operate the vehicle.

To prevent lamp 90 from draining the van's battery when the vehicle's engine or alternator is not operating, a timed disconnect switch is preferably included in the electrical circuitry which will turn lamp 90 off after it has been on for approximately 60 seconds.

From the foregoing description a number of significant advantages provided by the clamping apparatus of the present invention should be readily apparent. With the activation of a single switch, the novel clamping apparatus secures a wheelchair to the floor of a motor vehicle in the driver's position. Reverse operation of the switch releases the wheelchair from the floor enabling the wheelchair occupant to move the wheelchair out of the vehicle. A manual wheelchair release means is also provided which can be activated by the wheelchair occupant should the vehicle's electrical system fail. Accordingly, those skilled in the relevant art will appreciate that the present invention enables a wheelchair occupant to easily operate a motor vehicle by his or herself. In fact, most wheelchair occupants having the present invention installed in their vehicle will not require the assistance of other persons.

The invention has been described in detail with particular reference to a preferred embodiment thereof, but it will be understood that variations and modifications can be effected within the spirit and scope of the invention.

What is claimed is:

1. A clamping apparatus for releasably securing a wheelchair to a base, said apparatus comprising:

clamping adapter which is sized and configured so as to be capable of rigid attachment to a frame structure of the wheelchair;

a frame which is capable of being rigidly secured to a base;

a clamp which is pivotally attached to said frame and capable of being pivotally moved between a wheel chair clamping position and a wheelchair release position, said clamp being capable of clamping engagement with said clamping adapter when said clamp is in the clamping position so that a relative movement between the clamp and adapter is prevented and the wheelchair is in the clamping position so that a relative movement between the clamp and adapter is prevented and the wheelchair is secured to the base, said clamp also being capable of disengagement from said clamping adapter when said clamp is in the release position so that the wheelchair is capable of being moved relative to the base;

said clamp includes a pair of inner and outer telescoping members, each of said telescoping members having a telescoping end and an outer free end, said telescoping ends being releassably secured by a manual release means, the free end of one of said telescoping member being pitovally attached to said frame, the free end of the other telescoping member having a C-shaped clamp affixed thereto for clampingly engaging the clamping adapter when the movable clamp is moved into the clamping position; and actuating means for pivotally moving said moveable clamp between the positions, the actuating means includes a power driven actuator which is pivotally attached to said telescoping members by a bell crank means for moving said clamp between the positions, said frame is mounted below the surface of said base and the power driven actuator, bell crank means and pivoted end of the telescoping members is mounted within said frame and below the surface of said base, the portion of the frame adjacent to the surface of said base being open so that telescoping members and clamp for the clamping position can pivot upward above the base so as to engage the clamping adapter and yet allow the telescoping members with the clamp to be retracted below the surface of the base when the clamp is in the released position.

2. An apparatus as recited in claim 1 wherein said actuating means includes a motor, a linear actuator and a bell crank, said bell crank having a first end attached to said frame, a second end attached to said movable clamp, and a third end attached to the linear actuator which, in turn, is attached to the motor, said motor being reversible so that when activated in one direction it moves said clamp to the clamping position and when activated in the opposite direction it moves said clamp to the release position.

3. An apparatus as recited in claim 2 further comprising a sensing means attached to said clamp which senses when the clamp is in the clamping position and sends an electrical signal to an indicating means which indicates to an individual occupying the wheelchair that the clamp is in the clamping position.

4. An apparatus as claimed in claim 1 wherein said manual release means includes a threaded wing bolt and nut assembly which releasably secures said telescoping members to each other.

5. An apparatus as claimed in claim 1 wherein said base includes shallow tracks for the wheelchair's wheels.

6. An apparatus as recited in claim 1 wherein said clamping adapter includes a center bar and a pair of clamp means, each clamp means having a telescoping portion which telescopingly engages with its associated end of the center bar, said telescoping engagement enabling the overall length of the adapter to be movably adjusted which enables the adapter to accommodate different sized wheelchairs, each clamp means also having a C-shaped clamp portion which is sized and configured to fit over a portion of the wheelchair's frame, each of said clamp means also being provided with bolt means capable of being tightened to rigidly affix the clamping adapter to the wheelchair's frame.

* * * * *